Dec. 12, 1933.   R. T. SMITH   1,938,984
VALVE CONSTRUCTION
Filed Dec. 11, 1931

INVENTOR.
BY Russell T. Smith
Francis D. Hardesty.
ATTORNEY.

Patented Dec. 12, 1933

1,938,984

UNITED STATES PATENT OFFICE 1,938,984

VALVE CONSTRUCTION

Russell T. Smith, Greenville, Mich., assignor to Gibson Refrigerator Company, Greenville, Mich., a corporation of Michigan Application December 11, 1931
Serial No. 580,362

4 Claims. (Cl. 251—44)

This invention relates to valves particularly adapted for use with refrigerators.

Refrigerating systems of the closed type generally have, on the high and low pressure sides of the evaporator, fittings to which may be connected a meter, whereby the head pressure and back pressure readings may be taken. Such fittings usually include valves connected to the system and to which a meter could be connected, the valve being closed normally and being opened for meter reading. Valves of this character are relatively expensive and accordingly there is provided a valveless fitting, to which a valve and a meter may be secured, the fitting being normally closed but being opened for meter connection, without opening the system except to the meter.

An object of the invention includes, in combination with a nipple integrally secured to the system, a valve for opening the nipple and for creating communication between the interior of the system and a meter secured to the valve.

Still further objects will readily occur to those skilled in the art upon reference to the following description and the accompanying drawing in which Fig. 1 shows in section an embodiment of the invention, parts being in open position for meter reading.

Figure 1:
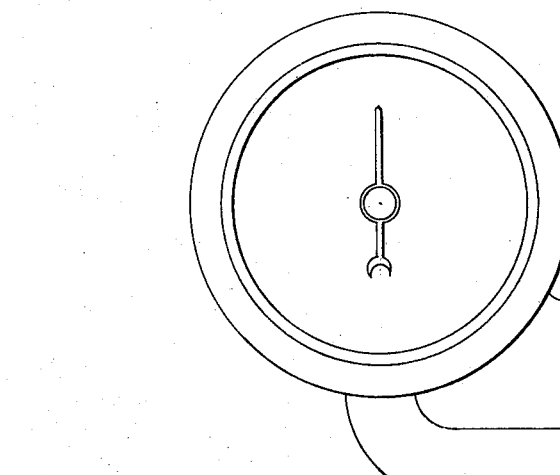

Referring to the drawing it will be seen that there is welded or otherwise integrally secured to a wall 10 of a system part, preferably a receiver on the high pressure side of the evaporator, or a compressor on the low pressure side, a fitting which includes a nipple 12. The latter is hollow, has a valve seat 14, and is internally threaded at 16. Threaded into the nipple is a plug 18 which normally engages the seat 14 to close the nipple and seal the system.

For use with the fitting there is provided a body 20 which may be threaded onto the external threads 22 of the nipple. The body is hollow and its interior communicates with a meter M thru an orifice 24 and a meter fitting 26. The end of the body 20 is closed by a packing nut 28 thru which projects the stem or shank 30, the latter having threads 32 which may mesh with the internal threads 33 of the packing nut. Suitable packing at 34 assists in maintaining a seal around the shank 30. On one end of the shank is a handle 36 and on the other end is a blade 38 which may be entered into and disposed in a slot 40 of the plug 18.

When it is desired to obtain a meter reading the body is threaded onto the nipple and the shank 30 is pushed axially downward until its blade 38 is seated in the slot 40. The handle 36 and shank 30 are then rotated to thread plug 18 out of the nipple 12 or to the position of Fig. 1, thus creating communication between the interior of the system part and the meter M, thru the nipple, the space between the plug 18 and the nipple wall, the interior of the body, the orifice 24, and the fitting 26. A reading is taken and when it is desired to restore the system to its original condition, the shank 30 is again rotated, but in a reverse direction, to thread the plug 18 back into the nipple to close the latter. The body is then unthreaded from the nipple and removed.

The refrigerating system is sold with nipples 12 and plugs 18 in place and the remaining parts are in the possession of the service or testing man who may use one body and meter device with any number of refrigerators. Accordingly, great reduction in the cost of refrigerators is effected, there being no expensive valves supplied with the refrigerator as permanent equipment.

Figure 2:
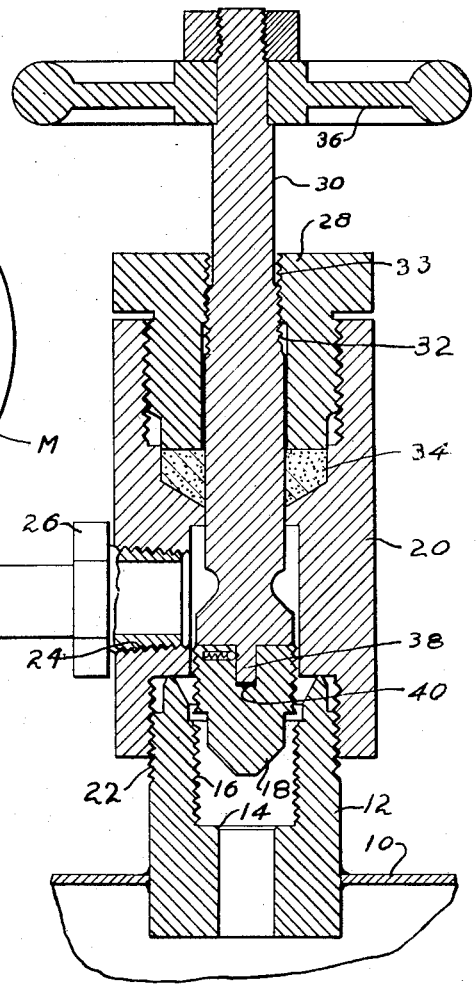
Fig. 2 is a similar view showing the parts in closed position.
Figure 2:
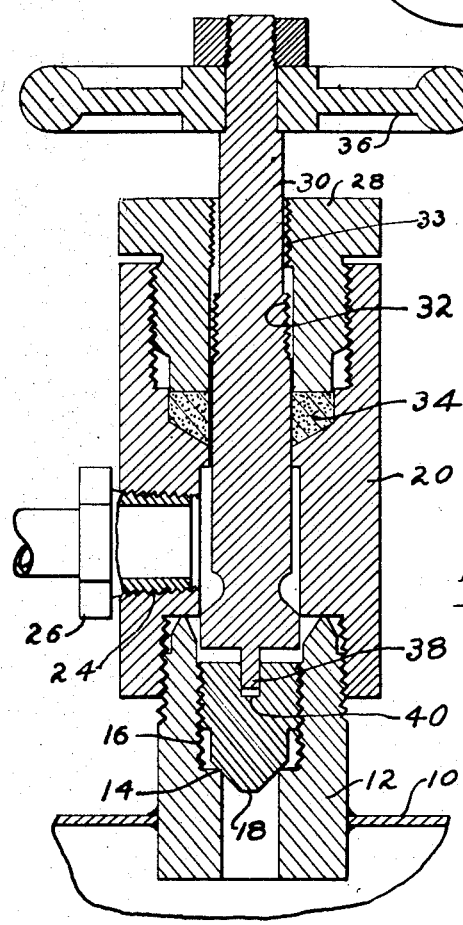
Figure 3:
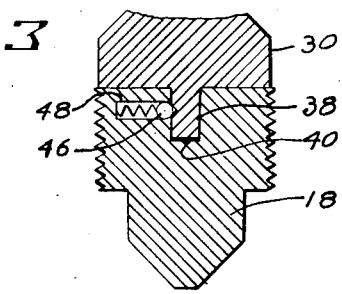
Fig. 3 shows a modification of a detail.

In the embodiment of Fig. 2 the plug 18 when in open position is so maintained by pressure within the system part 10. If it is desired to establish a positive means for maintaining the plug 18 elevated, a spring pressed ball 46 (Fig. 3) may be provided in a bore 48 in the plug communicating with the slot 40, the ball being pressed outwardly to create a friction grip between the blade 38 and the plug, but prevented from escaping from the bore by an overhanging edge, as shown in the drawing.

Now having described the invention and the preferred embodiment thereof, it is to be understood that the said invention is to be limited, not to the specific details herein set forth, but only by the scope of the claims which follow.

What I claim is:

1. In combination with a system part having a hollow nipple integrally secured to a wall thereof and a rotatable and axially movable plug in said nipple for sealing the latter, a hollow body removably but sealingly secured to said nipple, a shank mounted in said body for axial movement, a handle on one end of said shank, and a blade on the other end for engaging and cooperating with a slotted part of said plug to move the latter axially in the nipple, a wall of the body being provided with an orifice communicating with the interior thereof and therethru, with the nipple, the interior of the body, when it is on the nipple, being closed and sealed thereto at all places except at said orifice, and resilient means carried by the plug adjacent the slot to create a friction grip between the blade and the plug.

2. In combination with a system part having a hollow nipple integrally secured to a wall thereof, and a plug threaded in said nipple for sealing it, a hollow body threaded onto said nipple, a shank threadedly mounted in said body for axial and rotary movement, a handle on one end of said shank and a blade on the other for engaging and cooperating with said slotted part of said plug to rotate the latter and move it axially in the nipple, a wall of the body being provided with an orifice communicating with the interior thereof and therethru, with the nipple, the interior of the body, when it is on the nipple, being closed and sealed thereto at all places except at said orifice, and resilient means carried by the plug adjacent the slot to create a friction grip between the blade and the plug.

3. In combination with a system part having a hollow nipple integrally secured to a wall thereof and a rotatable and axially movable plug member in said nipple for sealing the latter, a hollow body removably but sealingly secured to said nipple, a shank mounted in said body for axial movement, a handle on one end of said shank, and a blade member on the other end for engaging and cooperating with a slotted part of said plug member to move the latter axially in the nipple, a wall of the body being provided with an orifice communicating with the interior thereof and therethru, with the nipple, the interior of the body, when it is on the nipple, being closed and sealed thereto at all places except at said orifice, resilient means carried by one of said engaging members to create a friction grip between it and the other engaging member.

4. In combination with a system part having a hollow nipple integrally secured to a wall thereof, and a rotatable plug member threaded in said nipple for sealing it, a hollow body threaded onto said nipple, a shank threadedly mounted in said body for axial and rotary movement, a handle on one end of said shank and a blade member on the other for engaging and cooperating with a slotted part of said plug member to rotate the latter and move it axially in the nipple, a wall of the body being provided with an orifice communicating with the interior thereof and therethru, with the nipple, the interior of the body, when it is on the nipple, being closed and sealed thereto at all places except at said orifice, resilient means carried by one of said engaging members to create a friction grip between it and the other engaging member.

RUSSELL T. SMITH.